Oct. 19, 1954  E. SCHLUETER  2,692,153
CENTER HINGE COLLAPSIBLE JOINT
Filed June 15, 1953  2 Sheets-Sheet 1

INVENTOR.
ERNEST SCHLUETER
BY
ATTORNEY.

Oct. 19, 1954  E. SCHLUETER  2,692,153
CENTER HINGE COLLAPSIBLE JOINT
Filed June 15, 1953  2 Sheets-Sheet 2
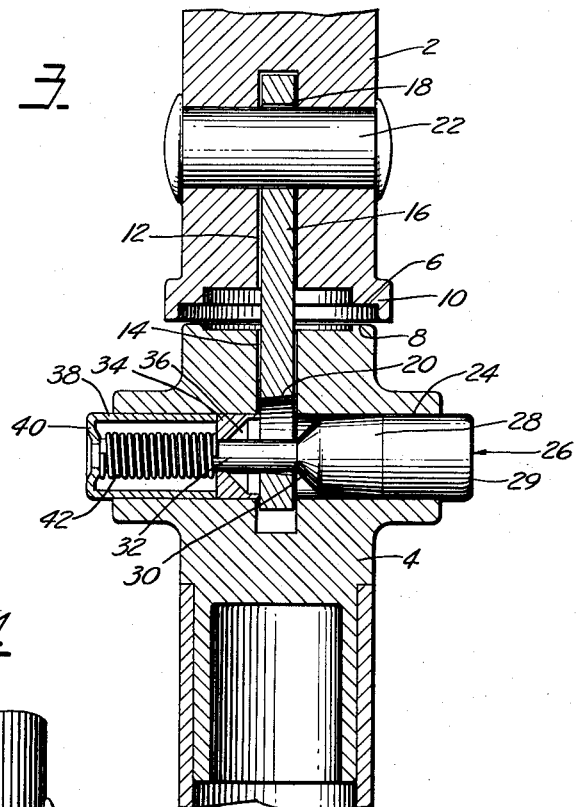
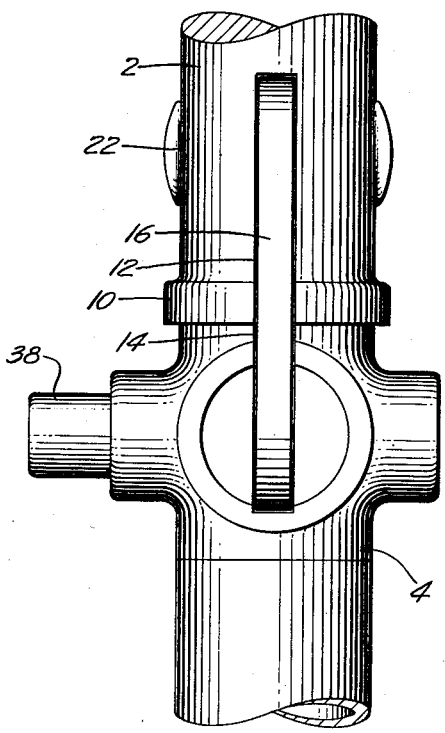
INVENTOR.
ERNEST SCHLUETER
BY H. M. Kilpatrick
ATTORNEY.

Patented Oct. 19, 1954

2,692,153

UNITED STATES PATENT OFFICE 2,692,153

CENTER HINGE COLLAPSIBLE JOINT

Ernest Schlueter, Troy, N. Y., assignor to Sim-Par Manufacturing Corp., Menands, N. Y., a corporation of New York Application June 15, 1953, Serial No. 361,611

4 Claims. (Cl. 287—14)

1

This invention relates to collapsible joint center hinges and to means for locking elements in one or more angular positions with respect to each other and more particularly to apparatus and devices for locking said elements in such positions without any play or loosely fitting joints, though it is noted that in some of the claims the invention is not limited to center hinges nor even to joints.

Objects of the invention are to provide an improved device or apparatus of this kind which may be used in the manufacture of collapsible stretchers, tables and the like where legs thereof are to be locked in the plane of stretcher or table and also locked perpendicular thereto.

Other objects of the invention are to provide an improved device of this kind which may be used in foldable collapsible shaftlike articles such as oar shafts, flag poles and the like.

Additional objects of the invention are to effect simplicity and efficiency in such apparatus and to provide an extremely simple device or apparatus of this kind which is economical, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a joint or hinge comprising two coupling members joined together by a link which can be oscillated in a slot of one of the members. The link is selectively loosely pivoted to the latter so that engagement faces of the members may be separated and the members moved with respect to each other. When selected engagement faces become parallel, a larger portion of the pivot pin enters the pivot hole in the link to draw the link inwardly and the faces into engagement and lock the joint.

In the accompanying drawing showing, by way of example, one of many possible embodiments of the invention, Fig. 1 is a partially transverse sectional view of the invention showing possible positions of the coupling members;

Fig. 2 is a transverse sectional view showing the members in locked position;

2

Fig. 3 is a view similar to that of Fig. 2 showing the members unlocked and,

Fig. 4 is a side elevation of the members in locked position.

Figure 1:
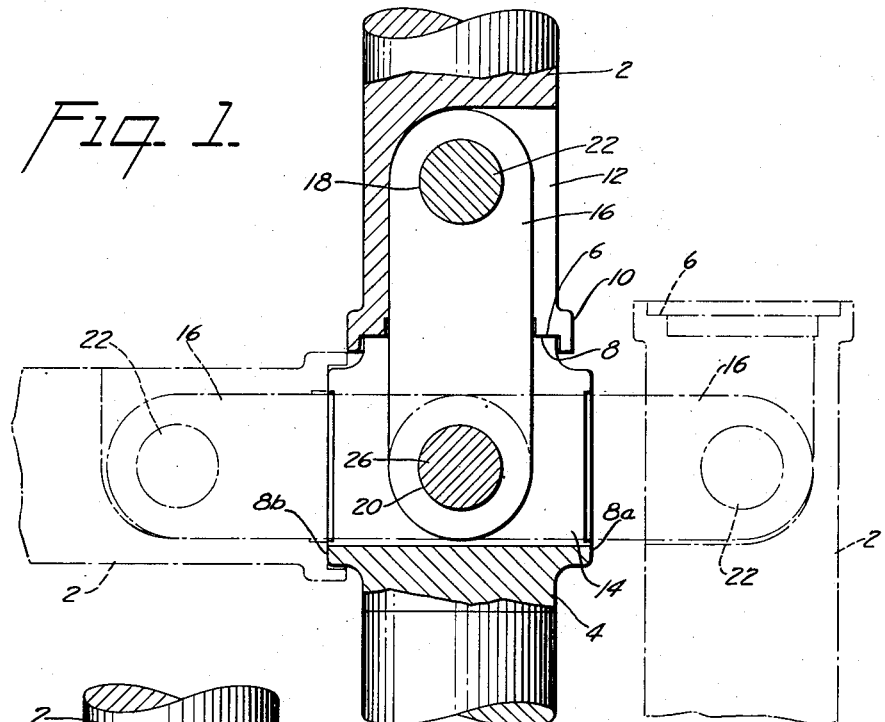

The collapsible joint is free of loose parts, and comprises, in combination, a pair of alinable rod-like relatively adjustable fixed bolt and movable plunger carrying members 2, 4 (sometimes also called coupling members) having flat interengaging engagement seats or faces 6, 8 perpendicular to the axes of the members when alined, the bolt carrying member 2 carrying a housing flange 10 disposed around said engagement faces, when the faces are engaged.

Said members 2 and 4 have adjacent alined slots 12, 14 of small thickness and longer than the diameters of the members and radial to the axes of the members when alined. The slots pass diametrically through the plunger carrying member 4 and radially through one side of the fixed bolt carrying member 2.

Figure 2:
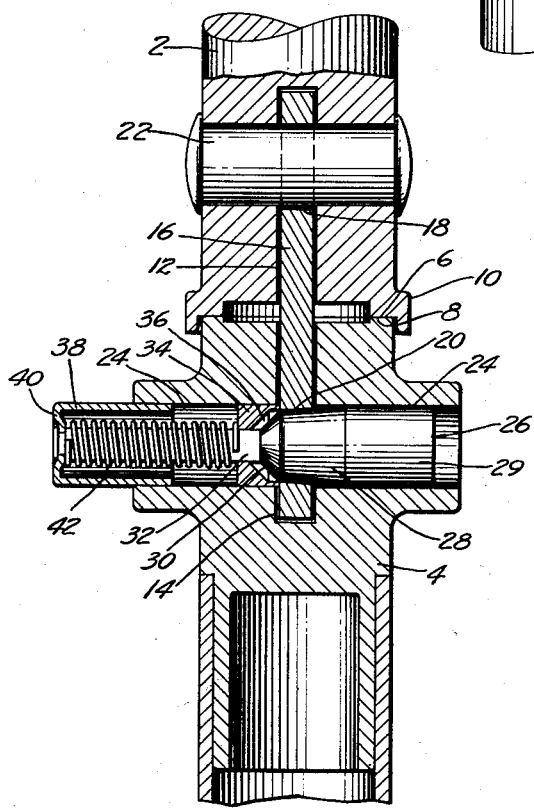

A flat link 16 is disposed in said slots and provided with bearing openings 18, 20 at its ends, the opening 20 adjacent to the movable bolt carrying member being axially tapered (see Fig. 2). One end of the link is connected to the member 2 by a fixed bolt 22 passing through the bolt carrying member 2 and the adjacent opening 18 of the link and forming a pivot for the link. The plunger carrying member 4 is provided with a diametric bore 24 (Fig. 2) alined with the tapered opening 20; and in the bore is disposed a plunger 26 having an intermediate long tapered portion 28 (Fig. 2) fitting in the tapered bore 20. The plunger includes a cylindrical portion 29 at the large end of the tapered portion slidably fitting in the bore 24, an abruptly tapered part 30 at the small end of the long tapered portion 28, and a reduced diameter or rod portion 32 at the small end of the tapered part extending coaxially to the exterior of the bore 24.

A washer 34 in the bore 24 is loose on the reduced diameter portion and engageable with the link 16, and provided with a substantially truncated-conical recess 36 for receiving the abruptly tapered part 30.

The plunger also includes a cup-shaped head 38 mounted on and receiving the outer end part of the reduced diameter portion 32, the head being open toward the washer 34 and having its end wall 40 riveted to the outer end of the reduced portion 32. A spring 42, compressed between the end wall 40 and washer 34 causes the long-tapered portion 28 to be held tightly in the tapered opening 20, holding said engagement faces 6, 8 tightly together and said members 2, 4 alined.

In operation, finger pressure on the cup-shaped head 38 will cause sliding of the plunger in bore 24 and may remove the tapered portion 28 and part from the tapered opening 20 and allow said faces 6, 8 to move far enough apart to allow said link 16 to pivot on the bolt 22 and plunger 26 to allow the link to move, in part, from the slots 12, 14 (Fig. 1) and to be disposed at right angles to both members, allowing the members 2, 4 to move parallelly adjacent to each other as at the dotted positions at the right of Fig. 1.

The plunger carrying member, as shown, is provided with lateral engagement faces 8a and 8b axially perpendicular to said plunger and the plunger carrying member either of which is adapted to receive the engagement face of the bolt carrying member when the link is longitudinal to the bolt carrying member and perpendicular to the plunger carrying member, there to be held when the long tapered part is drawn into the tapered opening by the spring.

If the members 2 and 4 need not be made to assume acute angle positions, the slot 12 may be omitted and the link 16 may be made fixed or even integral with the member 2.

I claim as my invention:

1. A collapsible joint comprising a pair of first and second coupling members having interengaging faces respectively; the first member being provided with a deep slot open toward the face thereof and a bore extending transversely of the slot; a link joined to the second coupling member and disposed in said slot and provided with a tapered opening therethrough; a plunger having a tapered portion movable in and longitudinally of the bore, said tapered portion passing through said opening, the plunger including a part having a diameter substantially equal to that of the bore and a part having a smaller diameter; a washer on the part of the smaller diameter and engaging a side of the link, and a spring compressed between an outer end portion of the plunger and the washer.

2. In a collapsible joint, a coupling member provided with an engagement face with a deep slot open toward the face and with a bore having the axis thereof transverse to the plane of the slot; a link member disposed in said slot and provided with a tapered opening therethrough; a plunger movable in and longitudinally of the bore and passing through said opening, the plunger including a tapered part having a maximum diameter substantially equal to that of the bore at one end, a stem having a smaller diameter at the other end portion, and a cap secured on the outer end of the stem and having a cylindrical portion slidably fitting in the bore, a spring coiled about the stem and having one end bearing against the plunger, and means for holding the other end of the spring relatively stationary so that the plunger is normally urged longitudinally of the bore.

3. A collapsible joint comprising a pair of first and second coupling members having interengaging faces respectively; the first member being provided with a deep slot intersecting the plane of its respective face and with a bore having the axis thereof intersecting the plane of the slot; a link jointed to the second coupling member and in said slot and provided with a tapered opening therethrough; a plunger in said bore having an intermediate long tapered portion fitting in the tapered opening, a cylindrical portion at the large end of the tapered portion slidably fitting in the bore, an abruptly tapered part at the small end of the tapered portion, and a reduced diameter portion at the small end of the tapered part extending coaxially to the exterior of the bore; a washer loose on the reduced diameter portion and engaged with the link, and having a substantially truncated-conical recess receiving the abruptly tapered part; and resilient means for normally urging the tapered portion toward and into the opening.

4. A collapsible joint comprising a pair of first and second coupling members having interengaging faces respectively; the first member being provided with a deep slot open toward the face thereof and a bore extending transversely of the slot; a link joined to the second coupling member and disposed in said slot and provided with a tapered opening therethrough; a plunger having a tapered portion movable in and longitudinally of the bore, said tapered portion passing through said opening, the plunger including a part having a diameter substantially equal to that of the bore and a part having a smaller diameter; a spring bearing against said plunger at one end; and means for holding the other end of the spring relatively stationary so as to maintain said tapered portion of the plunger in engagement with the link opening.

References Cited in the file of this patent

UNITED STATES PATENTS

| Number | Name | Date |
| --- | --- | --- |
| 579,277 | Lord et al. | Mar. 23, 1897 |
| 649,362 | Ryan et al. | May 8, 1900 |
| 842,847 | Mason | Jan. 29, 1907 |
| 845,121 | Reniff | Feb. 26, 1907 |
| 857,831 | Richards | June 25, 1907 |
| 1,029,967 | Bolen et al. | June 18, 1912 |
| 1,701,417 | Minelli | Feb. 5, 1929 |
| 2,033,605 | Benzing | Mar. 10, 1936 |
| 2,121,572 | Polden et al. | June 21, 1938 |
| 2,352,565 | Ranson | June 27, 1944 |
| 2,556,995 | Coffing | June 12, 1951 |
| 2,658,643 | Miller et al. | Nov. 10, 1953 |